April 5, 1949. H. T. BEAN 2,466,568
AIRCRAFT LANDING WHEEL ROTATING MEANS
Filed May 2, 1944 2 Sheets-Sheet 1
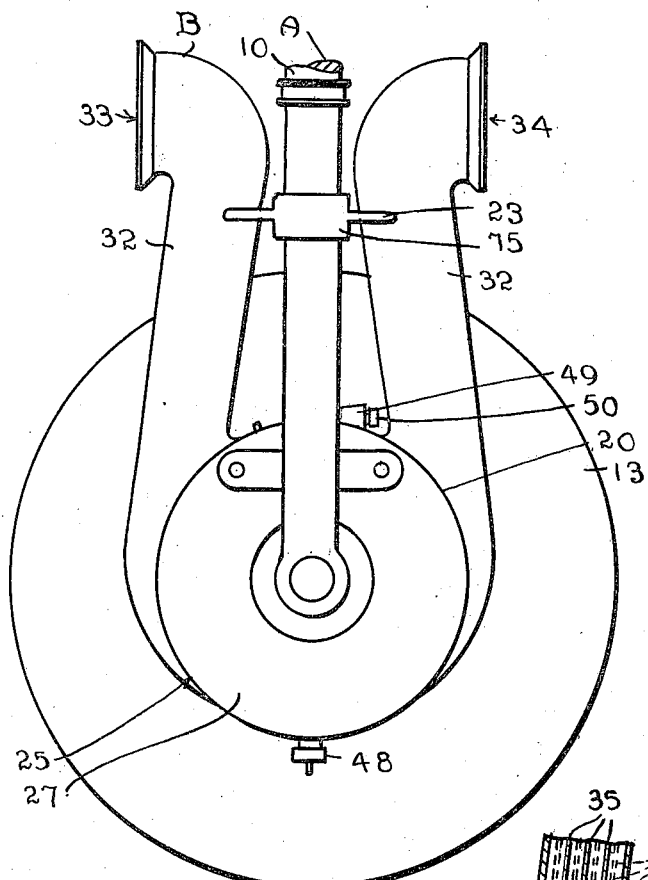
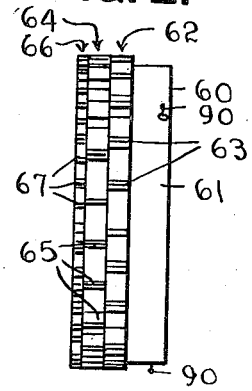
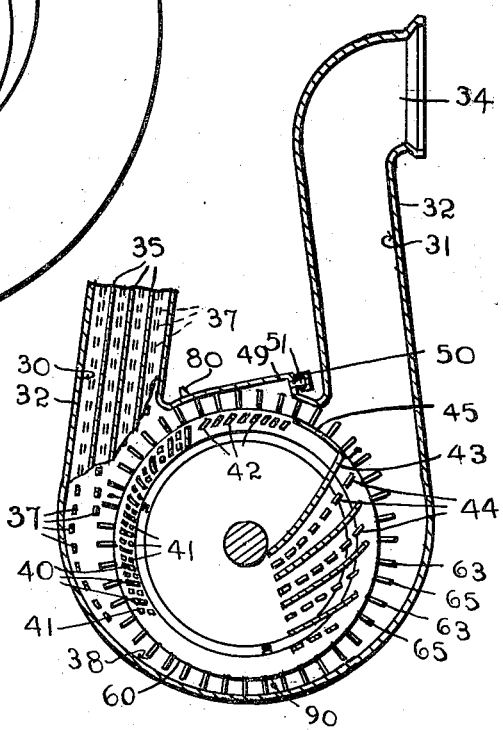
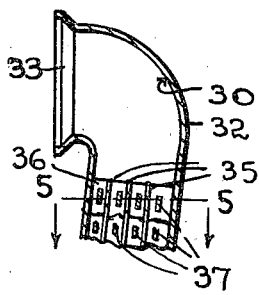
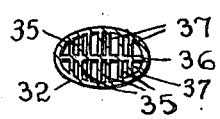
INVENTOR.
Harold T. Bean
BY Lancaster, Allwine Rommel
ATTORNEYS.

April 5, 1949.  H. T. BEAN  2,466,568
AIRCRAFT LANDING WHEEL ROTATING MEANS
Filed May 2, 1944  2 Sheets-Sheet 2

INVENTOR.
Harold T. Bean
BY
ATTORNEYS.

Patented Apr. 5, 1949

2,466,568

UNITED STATES PATENT OFFICE 2,466,568

AIRCRAFT LANDING WHEEL ROTATING MEANS

Harold T. Bean, Santa Monica, Calif.

Application May 2, 1944, Serial No. 533,716

3 Claims. (Cl. 244—103)

This invention relates to aircraft landing gear and more particularly to means for rotating the wheels of such gear.

An important object of the invention is to provide an air-driven means for rotating the landing gear wheels, or like devices, while the aircraft is in flight, so that the peripheral speed of the devices will be substantially the same as the relative aircraft and ground speed at the moment the periphery of the devices contact the landing area surface.

Another important object is to provide such air-driven, enclosed means, including a rotor portion, for the purpose described, whereby outside interference with or damage to the rotor portion will not take place.

Still another important object is to provide such an enclosed air-driven means which, including its housing, is light in weight and not cumbersome.

Other objects and advantages of the invention will be apparent during the course of the following detailed description of the invention, taken in connection with the accompanying drawings, forming a part of this specification, and in which drawings:

Figure 1 is an end elevation of the novel wheel-rotating means.

Figure 2 is a somewhat diagrammatic side elevation of the rotor portion of the wheel-rotating means of the construction.

Figure 3 is a somewhat diagrammatic view of the rotor portion and adjacent cooperating air ducts and reactor baffles forming a part of the construction.

Figure 4 is a vertical section of the intake of the air duct housing.

Figure 5 is a section upon substantially the line 5—5 of Figure 4.

Figures 6, 7, 8:
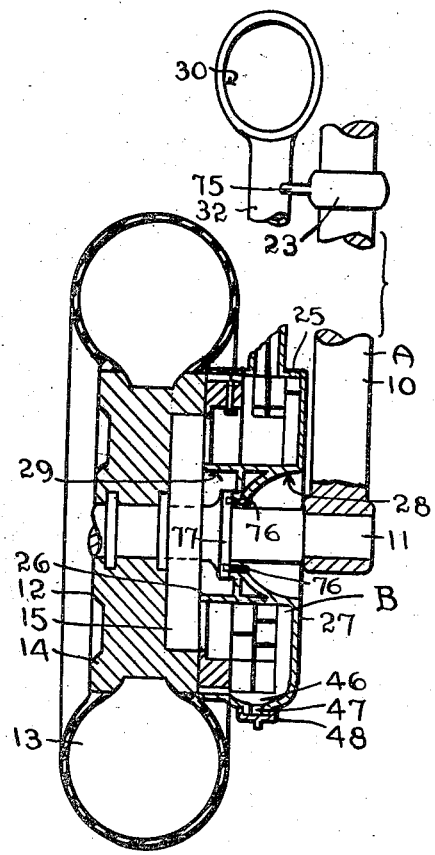
Figure 6 is a vertical section thru the assembled wheel-rotating means.
Figure 7 is a vertical section of the stationary and rotor portions of the wheel-rotating means, separated.
Figure 8 is a side elevation of a rotor bracket.

In the drawings, wherein for the purpose of illustration is shown a preferred embodiment of the invention and wherein similar reference characters designate corresponding parts throughout the several views, the letter A may designate generally a conventional aircraft landing gear and B the novel wheel-rotating means.

The landing gear A illustrated includes landing gear strut 10, carrying the wheel spindle 11, upon which is mounted the landing wheel assembly 12 which includes a tire 13 carried by a rim 14. Also illustrated is a brake drum 15.

As for the novel wheel-rotating means B, this includes a stationary housing 20, a rotor 21 within the housing 20, means 22 for securing the rotor 21 to the wheel assembly 12 to rotate therewith, and means 23 for securing the housing 20 to the landing gear A, preferably to the strut 10 thereof.

The stationary housing 20 includes an outer cylindrical wall portion 25, open at its inner end 26 and closed at its other end by an end wall 27 having a centrally-disposed opening 28 accommodating the spindle 11 and surrounded by an inner cylindrical wall 29. The housing 20 is provided with an air-intake passageway 30 and air exhaust passageway 31, each comprising an upstanding hollow arm portion 32 and a mouth portion, the intake mouth portion 33 opening forwardly and the outlet or exhaust mouth portion 34 opening rearwardly with the horizontal axes of the two mouth portions 32 and 33 aligning and normal to the axis of rotation of the wheel assembly 12. These arm and mouth portions are somewhat similar in shape to conventional ships' ventilators and, of course, the passageways 30 and 31 open into the main or cylindrical portion of the housing 20.

Preferably spaced inwardly of the intake mouth portion 33 are a plurality of spaced-apart substantially vertically-disposed, preferably elongated, air-director baffles 35 which extend from one wall of the arm portion 32 to a centrally-disposed vertical baffle 36, while air-director baffles similar to the baffles 35 extend from the opposite wall of the arm portion 32 to the baffle 36. Paralleling the vertical planes of the baffles 35 are a number of short, vertically-disposed baffles 37 also spaced inwardly of the mouth portion 33 arranged in rows, and secured to the walls of the arm portion 32 and baffle 36. It will be noted that at least the lowermost section of some of the baffles 35 and rows of baffles 37 curve inwardly toward the central chamber 38 of the housing 20.

Extending from the end wall 27 of the housing 20 inwardly of the outer wall portion 25, are a plurality of spaced-apart, non-radially disposed, stationary baffle fins. These comprise short stationary low-pressure reactor baffle fins 40, associated shorter, low-pressure reactor baffle fins 41, two of which may be interposed between each fin 40, a plurality of preferably very short spaced-apart high pressure reactor baffle fins 42 next adjacent the fins 40 and 41, a plurality of long, suction director baffle fins 43 and associated short, suction director baffle fins 44 in rows between adjacent fins 43, all substantially as shown in Figure 3. The end fin of the fins 43 next adjacent the last fin 42 has an arcuate extension 45, extending toward the fins 42.

At the lowermost section of the outer wall portion 25, is a sump 46 and opening 47, constituting a drain means, with the opening closed by a suitable removable closure 48.

Suitably disposed, such as at the uppermost section of the wall portion 25, is an auxiliary air intake nipple 49 having a suitable removable closure 50 and a passageway 51 to the chamber 38, for a purpose later detailed.

The rotor 21 includes a ring-like support or housing 60, provided with a side flange 61 in abutment with the wheel rim 14 and, at its opposite end, having a plurality of radial rotor vanes, preferably arranged as follows:

One series 62 next adjacent the support 60, being low pressure rotor vanes 63; next another series 64 of low pressure rotor vanes 65, staggered with relation to the vanes 63, and an outer series 66 of high pressure rotor vanes 67, being spaced nearer together than are the other vanes 63 and 65. When assembled, and attached to the rotor 21 in any approved way, the vanes 63, 65 and 67 are outwardly of the baffle fins 40, 41, 42, and 43 and 44. The means 22 for securing the rotor 21 to the wheel assembly 12 to rotate therewith, may comprise cap screws 70 extending through the flange 61 and into the rim 14.

Means 23 for securing the housing 20 to the landing gear A may comprise a bracket 75, suitably secured as to the strut 10 and, in turn, securing the housing 20, as at the arm portions 32, and screws 76, extending through wall 27 into spindle flange 77.

From the foregoing, it will be seen that, when the parts are assembled and secured as desired, and the landing gear is extended, just prior to landing, air will enter the forwardly-opening intake mouth portion 33 and pass down the passageway 30, being guided by the air-director baffles 35, 36 and 37, and strike the vanes 63, 65 and 67 causing the rotor 21 to spin and, consequently, impart rotation to the wheel assembly 12. The various stationary reactor baffle fins 40 to 44 will prevent loss of the air current until it has done its impelling work, whereupon the air will move up the free passageway 31 and exhaust from the mouth portion 34, providing a desirable air suction. Manipulation of the brake drum 15, as is well known, will slow the rotation of the wheel assembly 12 and, consequently, that of the rotor 21.

Arm portion 32 is divided by baffles to provide proper distribution of air pressure and direct it against rotor vanes 62 and 64 (Figure 2) which are offset to provide larger surface for the development of greater energy to overcome the initial starting torque. Air passing through ducts created by baffles 37 develops pressure on vanes 64 and ducts created by baffle 35 (Figures 4 and 6) develops pressure on vanes 62 (Figure 2). The air in the rotary portion of the device has a radial flow after entering the rotary portion of the device. The flow of air is as follows: high pressure air, entering through passageway 51, exerts force on the high pressure rotor vanes 67 and a counter pressure, resulting from striking baffle fins 42 and is then exhausted between fins 44 and passageway 31. Low pressure air, entering intake 33, passes through ducts created by baffles 35 and 37, develops force on rotor vanes 62 and 64 (additional force being created by direction of air on baffle fins 40 and 41) thence being exhausted through suction baffle fins 43 and 44 which again create additional force on rotor vanes 62 and 64, resulting from negative pressure in passageway 31. Baffle fins 42 provide additional force against rotor vanes 67 because fins 42 create a high resistance to the air flow directed on vanes 67.

When the aircraft is in flight, and just prior to landing, the novel wheel rotating means B become operative, by extending the landing gear A. This places the air passageways 30 and 31 in the high velocity flow of air, causing the landing wheels 13 to rotate.

In order to make various adjustments of the landing wheel structure, after the aircraft is suitably jacked up or suspended above the hangar floor, air under suitable pressure may be introduced from the hangar supply, into the nipple 49, causing rotation of the wheels.

While a desirable arrangement of vanes and fins is shown, the arrangement may be varied to provide for different landing wheel sizes and other conditions.

From the foregoing, it will be seen that there is provided a compact assembly including dual-functioning parts, with the rotor vanes protected against damage upon landing, and the various baffle fins so arranged that braking of the rotor 20 will not cause its vanes to become distorted nor tear loose.

What is claimed is:

1. In combination with an aircraft landing gear assembly, including a wheel spindle and a wheel mounted for rotation thereon, a landing gear wheel-rotating apparatus, including a stationary housing, defining a chamber, and a rotor therein secured for rotation to said wheel, said housing having an end wall, a pair of upstanding, hollow arm portions, each arm portion being provided with a mouth at its upper end, one of said arm portions having an air intake passageway with a plurality of substantially parallel baffles extending from inwardly of the mouth thereof toward said rotor and being curved toward said rotor at their lower ends, the other of said arm portions providing an air exhaust passageway, and said housing having a plurality of rows of air suction director baffle fins projecting from said end wall toward said rotor and disposed in substantial parallelism with the axis of rotation of said rotor, and said rows being non-radially disposed with respect to the axis of rotation of said rotor and extending toward and closely adjacent the inner end of the air exhaust passageway, said rotor having a plurality of radially-extending vanes constructed and arranged, upon rotation of said rotor, to extend to closely adjacent the inner ends of said passageways.

2. In combination with an aircraft landing gear assembly, including a wheel spindle and a wheel mounted for rotation thereon, a landing gear wheel-rotating apparatus, including a stationary housing, defining a chamber, and a rotor therein secured for rotation to said wheel, said housing having an end wall, a pair of upstanding, hollow arm portions, each arm portion being provided with a mouth at its upper end, one of said arm portions having an air intake passageway from its mouth to said chamber and the other of said arm portions having an air exhaust passageway from said chamber to its mouth, and said housing having a plurality of rows of air suction director baffle fins projecting from said end wall toward said rotor and disposed in substantial parallelism with the axis of rotation of said rotor, and said rows being non-radially disposed with respect to the axis of rotation of said rotor and extending toward and closely adjacent the inner end of the air exhaust passageway, said rotor having a plurality of radially-extending vanes, constructed and arranged, upon rotation of said rotor, to extend to closely adjacent the inner ends of said passageways.

3. In combination with an aircraft landing gear asssembly, including a wheel spindle and a wheel mounted for rotation thereon, a landing gear wheel-rotating apparatus, including a stationary housing, defining a chamber, and a rotor therein secured for rotation to said wheel, said housing having an end wall, a pair of upstanding, hollow arm portions, each arm portion being provided with a mouth at its upper end, one of said arm portions having an air intake passageway from its mouth to said chamber and the other of said arm portions having an air exhaust passageway from said chamber to its mouth, and said housing having a plurality of air suction director baffle fins projecting from said end wall toward said rotor and disposed in substantial parallelism with the axis of rotation of said rotor, said fins comprising elongated fins alternating with rows of short fins, said rows being non-radially disposed with respect to the axis of rotation of said rotor, said elongated fins extending toward the inner end of the air exhaust passageways and said rows of fins extending toward the inner end of said exhaust passageway.

HAROLD T. BEAN.

REFERENCES CITED

The following references are of record in the file of this patent:

UNITED STATES PATENTS

| Number | Name | Date |
|---|---|---|
| 219,894 | Babbitt | Sept. 23, 1879 |
| 759,877 | Goodspeed | May 17, 1904 |
| 774,964 | Dahl | Nov. 15, 1904 |
| 801,585 | Hachenberg | Oct. 10, 1905 |
| 830,497 | Dahl | Sept. 11, 1906 |
| 2,063,032 | Fator | Dec. 8, 1936 |
| 2,320,547 | Tiger | June 1, 1943 |
| 2,370,316 | Juul | Feb. 27, 1945 |
| 2,372,207 | Kendrick | Mar. 27, 1945 |

FOREIGN PATENTS

| Number | Country | Date |
|---|---|---|
| 142,137 | Austria | June 25, 1935 |
| 434,363 | Great Britain | Aug. 30, 1935 |